Nov. 30, 1954   C. E. LARRABEE ET AL   2,695,492
RADIO TIME SIGNAL CLOCK CORRECTING MEANS
Filed April 7, 1953   6 Sheets-Sheet 1

INVENTORS
CLINTON E. LARRABEE
CARL T. YOUNG
BY
Geoffrey Knight
ATTORNEY

Nov. 30, 1954  C. E. LARRABEE ET AL  2,695,492
RADIO TIME SIGNAL CLOCK CORRECTING MEANS
Filed April 7, 1953 6 Sheets-Sheet 2

INVENTORS
CLINTON E. LARRABEE
CARL T. YOUNG
BY
Geoffrey Knight
ATTORNEY

Nov. 30, 1954 C. E. LARRABEE ET AL 2,695,492
RADIO TIME SIGNAL CLOCK CORRECTING MEANS
Filed April 7, 1953 6 Sheets-Sheet 3

INVENTORS
CLINTON E. LARRABEE
CARL T. YOUNG
BY Geoffrey Knight
ATTORNEY

Nov. 30, 1954  C. E. LARRABEE ET AL  2,695,492
RADIO TIME SIGNAL CLOCK CORRECTING MEANS
Filed April 7, 1953                                      6 Sheets-Sheet 4

INVENTORS
CLINTON E. LARRABEE
CARL T. YOUNG
BY
Geoffrey Knight
ATTORNEY

INVENTORS
CLINTON E. LARRABEE
CARL T. YOUNG
BY Geoffrey Knight
ATTORNEY

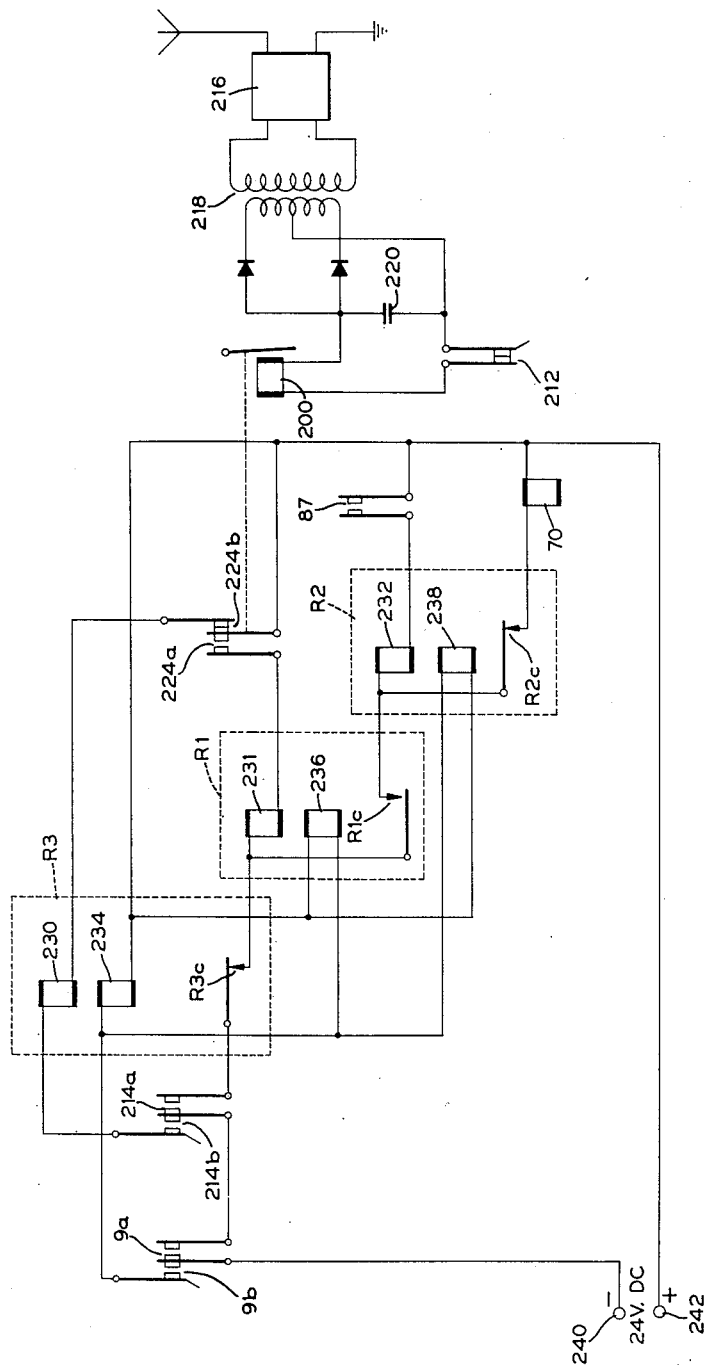

United States Patent Office 2,695,492
Patented Nov. 30, 1954

2,695,492

RADIO TIME SIGNAL CLOCK CORRECTING MEANS

Clinton E. Larrabee and Carl T. Young, Binghamton, N. Y., assignors to International Business Machines Corporation, New York, N. Y., a corporation of New York Application April 7, 1953, Serial No. 347,313

10 Claims. (Cl. 58—35)

This invention relates to clocks which are synchronized with an accurate time standard by means of radio time signals, such as the official time signals of the National Bureau of Standards Station, WWV.

One of the problams involved in the use of these signals is the interference caused by static. This is particularly troublesome when the station at which the signals are received is at some distance from the source. Fading is another problem for all but nearby receivers.

The general object of the invention is to provide an improved clock synchronized by radio time signals.

A further object is to provide a clock synchronized by radio time signals, the synchronizing means being protected against false operation caused by static or signal variation.

Still another object is to provide a clock with improved means responsive to radio time signals, for eliminating at frequent intervals accumulated errors caused by inherent inaccuracy of the clock mechanism.

At the present time the WWV signal is a tone modulated signal of two alternately occurring frequencies, namely, 600 cycles and 440 cycles per second. The 600 cycle signal begins exactly on the hour and continues for 4 minutes. This is followed by one minute of silence and at exactly 5 minutes past the hour the 440 cycle signal starts and continues for 4 minutes. After another gap of one minute of silence the 600 cycle signal begins again at exactly 10 minutes past the hour. This sequence continues 24 hours a day.

It is evident that only the beginning and end of these signals identify exact times. The beginning of a signal is not suitable for use to set the clock by, because at the instant of beginning it cannot be ascertained with certainty whether it is the beginning of the signal or a burst of static. The length characteristic of the time signal cannot be utilized at the beginning of the signal to identify it as a time signal.

A particular object of the invention is, therefore, to test radio time signals by duration and strength and to condition clock resetting means for a resetting operation if the signal meets the test.

Another object is to test radio time signals for strength and duration and to utilize the final portion of a signal which qualifies in both of these respects to set the clock.

Other objects of the invention will be pointed out in the following description and claims and illustrated in the accompanying drawings, which disclose, by way of example, the principle of the invention and the best mode which has been contemplated of applying that principle.

In the drawings:

Fig. 7 is a circuit diagram.

Figure 1:
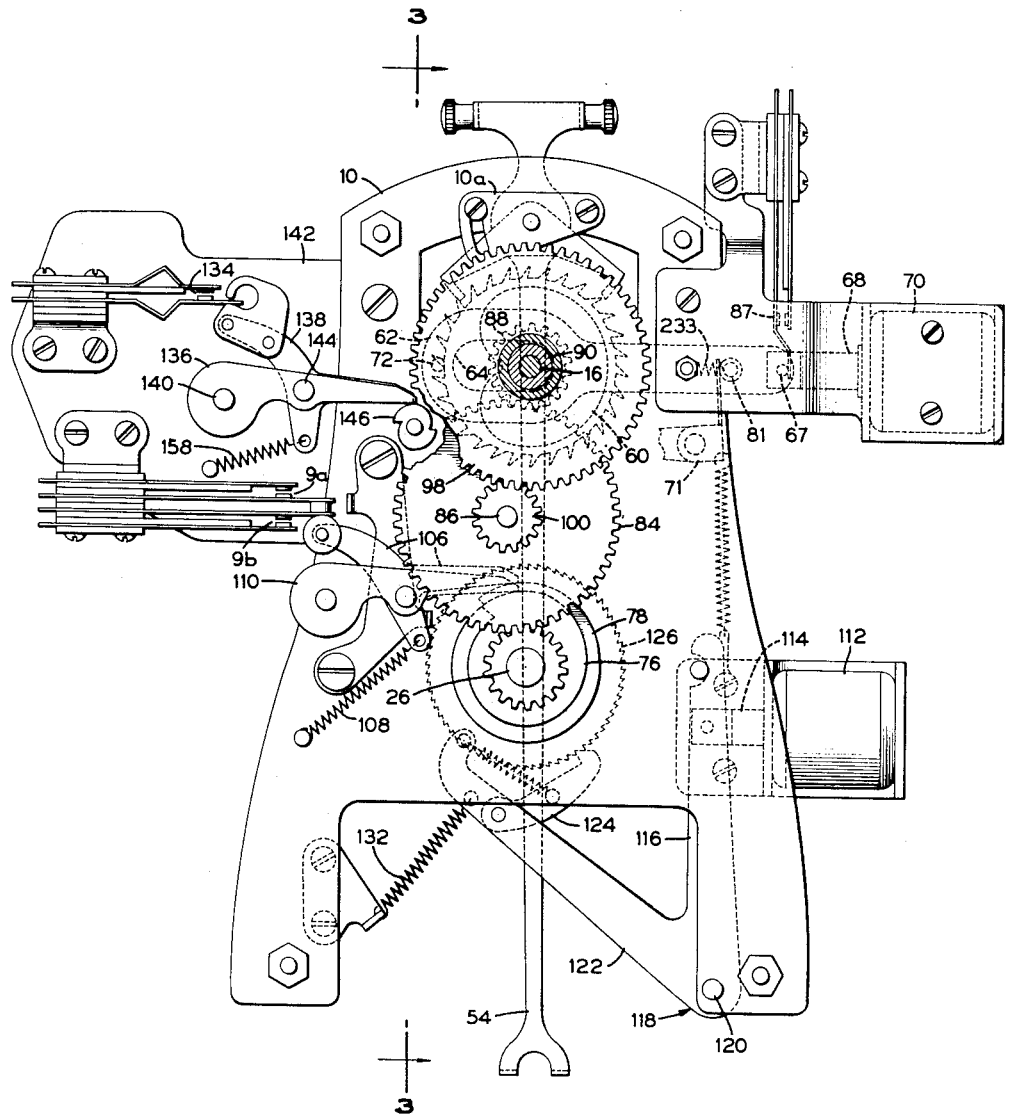
Fig. 1 is a vertical section of a master clock embodying the invention, substantially on the line 1—1 of Fig. 3.

By way of illustration of the invention it is shown embodied in a master clock of the type shown in Larrabee patent, 1,878,931. This is a clock of good accuracy of the kind used for regulating secondary clocks. When well adjusted it will keep time within a few seconds a day. By means of the present invention such a clock can be made to keep time indefinitely with a variation not substantially greater than ½ second from the time established by standard time signals. The clock shown in the drawing can be restored to true time if it is not more than 10 seconds slow or fast. If it has a greater error at the time the correction signal is received the correction mechanism operates idly each correction cycle until the clock is reset by hand.

The clock comprises two plates 10 and 12 united by pillars such as 14 into a rigid frame. Mounted in bearings in these plates is a seconds shaft 16 having a seconds hand 18 secured to the front end and a pinion 20 fixed near its rear end. The pinion 20 is driven by a spring 22 through gearing comprising a large gear 24 fixed to a shaft 26 and meshing with a small gear 28 fixed to a shaft 30, which also has secured upon it a large gear 32 meshing with pinion 20.

Revolvably mounted on the seconds shaft is a unit consisting of a barrel 34, an escape wheel 36, a ratchet wheel 38, and a serrated clutch disc 40 having 60 teeth. A clutch lever arm 42 secured by a hub 44 on the seconds shaft 16 carries a ball 46 which engages the clutch disc 40 under the pressure of a spring 48. Thereby the escape wheel and the seconds shaft are normally retained in the same angular relationship, but this can be changed by slipping the clutch ball over the clutch disc.

A verge 50 mounted by its shaft 52 in adjusting plates 10a and 12a on the respective side plates 10 and 12 coacts with the escape wheel 36 in the usual manner. The verge shaft 52 has adjustably mounted upon it a pendulum arm 54.

Resetting mechanism

Also affixed to the hub 44 is a heart cam 60. Adjacent the heart cam is a slide bar 62 having an elongated guide opening 64 whereby it is slidably mounted on a grooved bushing 66 fixed to the plate 10. One end of the slide bar is attached by a pin 67 to the shaft 68 of a solenoid 70, which will be referred to as the correction solenoid. At the outer end of the slide bar is a pin 72 which is adapted to engage the heart cam when the solenoid shaft is pulled to the right and, by sliding into the notch of the heart cam, to position the seconds shaft in an exact position, namely, the 60th second position in this case.

Coacting with the ratchet wheel 38 (Fig. 2) is a rock lever 71 pivoted on a stationary shaft 73 and having an arm 75 with an ear 77 adapted to engage the ratchet wheel when the rock lever is tilted clockwise by a spring 79. This occurs whenever the resetting slide 60 moves to the right in Fig. 2 and its pin 81 releases an arm 83 of rock lever 71. The rock lever prevents backward movement of the escape wheel 36 if the seconds shaft is reset counterclockwise from a fast position. Forward movement of the escape wheel when the seconds shaft is reset from a slow position is prevented by whichever arm of the verge is engaging the escape wheel at the time.

An extension of pin 67, which articulates slide 62 to shaft 68, closes a knockoff contact 87 each time the correction solenoid 70 operates.

The main spring shaft 26, governed by the escapement mechanism, turns at the rate of one revolution per hour. On the front end of the shaft 26 is revolvably mounted a unit consisting of a hub 74, two cams 76 and 78, and a gear 80. This unit is driven by the shaft 26 through a spring friction spider 82. Through an idler gear 84 revolvably mounted on a stationary shaft 86 the gear 80 drives at one revolution per hour a gear 88 fixed to the minutes shaft 90, which carries the minutes hand 92. The hours hand 94, carried by shaft 96, is driven at one revolution in 12 hours by gears 98 and 100. The minute and hour shaft assembly is held in place on the seconds shaft 16 by a spring clip 102 secured to the gear 88 and engaging a stationary grooved bushing 104.

When the minutes and hours hands are manually set the friction spider 82 slips on the face of cam 78. When the seconds shaft is reset by the heart cam mechanism the minutes and hours hands are driven proportionately by the turning of shaft 26.

The cams 76 and 78 control so-called "hour contacts" 9a and 9b through a conventional lever assembly of the type shown in Larrabee patent, 1,878,931. At 58' 45" of each hour the horizontal arm of lever 106 drops off the step of cam 78 and the lever is rocked by spring 108 to close contact 9a. At 59' 15'' lever 110 drops off the step of cam 76 and lever 106 moves down bodily to allow contact 9a to open and contact 9b to close. About three minutes later the lever assembly 106, 110 is raised to open contact 9b.

Figure 2:
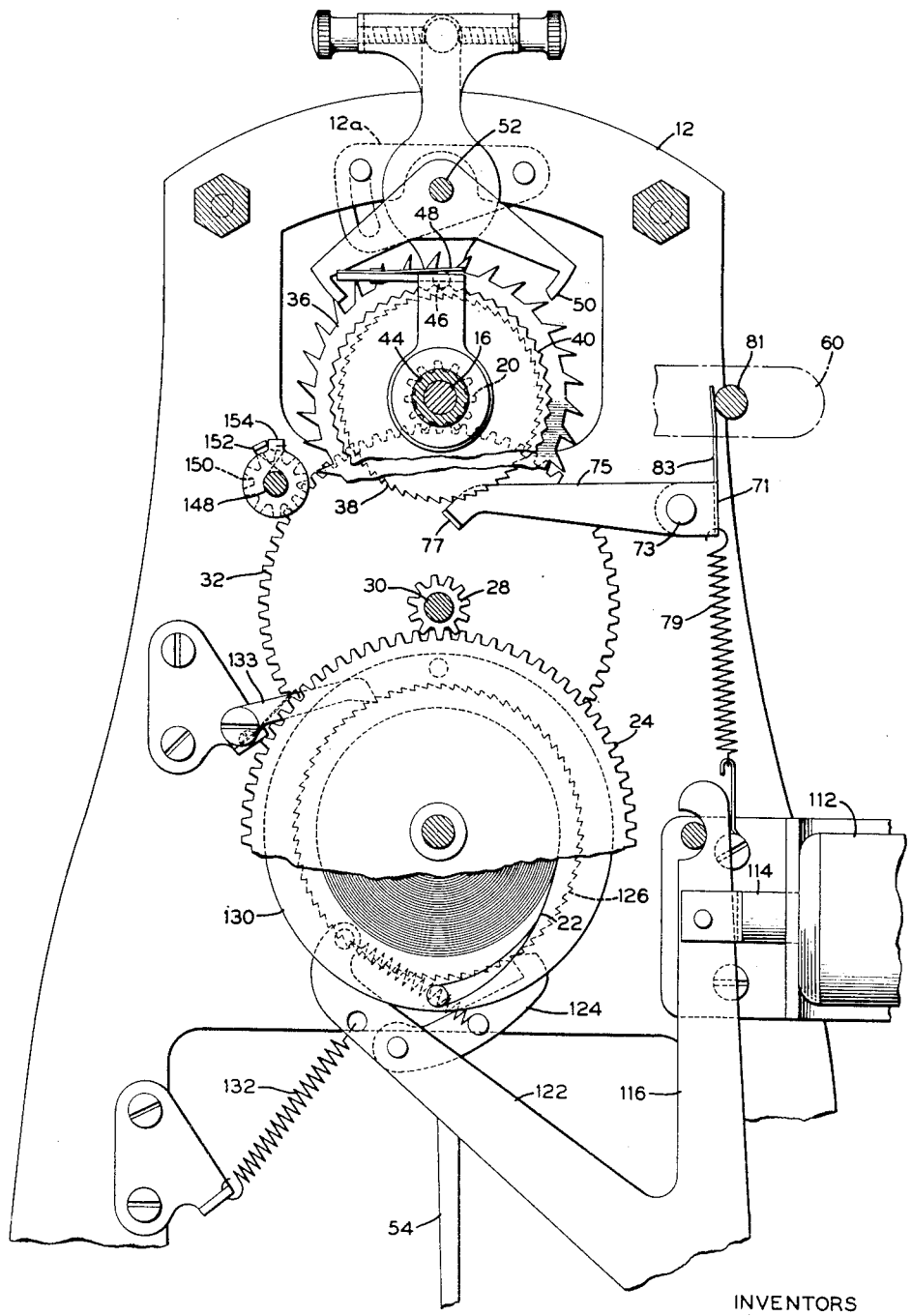
Fig. 2 is a vertical section of the same clock, substantially on the line 2—2 of Fig. 3.
Figure 3:
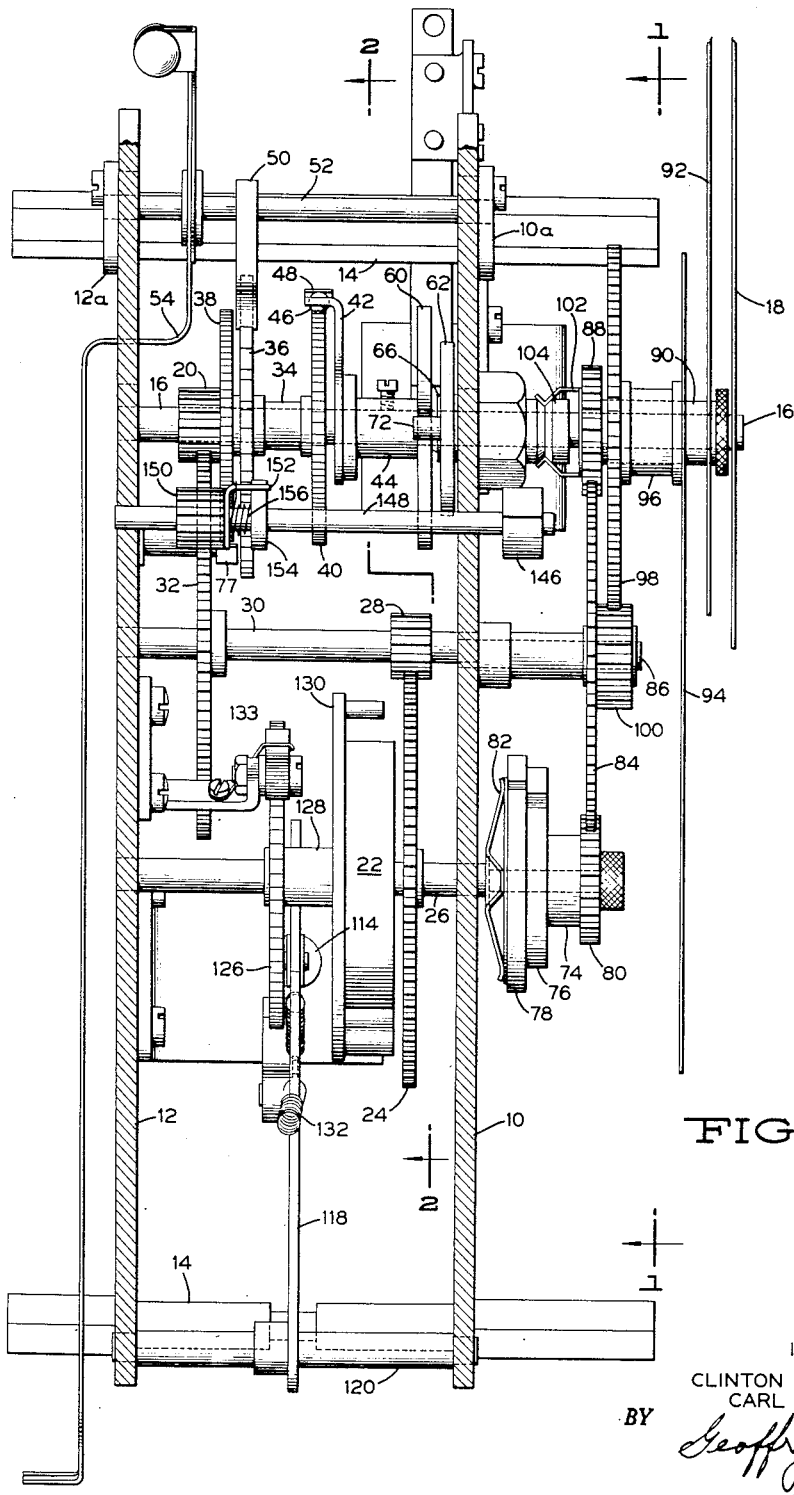
Fig. 3 is a vertical section of the clock, substantially on the line 3—3 of Fig. 1.

The clock spring 22 is electrically wound by a solenoid 112 (Fig. 2). The shaft 114 of the solenoid is connected to one arm 116 of a bell crank lever 118 (Fig. 1) mounted on a rocking pivot 120. The other arm 122 carries a spring influenced dog 124 which engages a ratchet wheel 126 fixed to the hub 128 of the spring anchor plate 130. The winding solenoid receives an impulse each minute and its shaft pulls the dog 124 to the right one tooth on the ratchet wheel 126. When the impulse ends a spring 132 pulls the bell crank lever 118 to the left and the dog rotates the ratchet wheel. A retaining pawl 133 holds the ratchet wheel in its advanced position.

The winding impulse comes from a pair of contacts 134 actuated by a lever assembly comprising two levers 136 and 138. The former is pivoted at 140 on a frame plate 142 while the latter is pivoted at 144 to lever 136. The right ends of levers 136 and 138 bear on a double lobed cam 146. The shaft 148 of cam 146 is driven at one-half revolution per minute by a pinion 150 engaging gear 32. The pinion 150 is free on shaft 148, but drives the shaft through a coupling comprising an arm 152 on the pinion, a stepped disc 154 fixed to the shaft, and a spring 156 yieldingly holding the arm against the step of the disc. This construction avoids damage if the seconds shaft is reset backward at a time when the step of the cam 146 has just passed the ends of the levers 136 and 138. The right end of lever 138 is a little shorter than that of lever 136 and drops off of a step of cam 146 first each minute. A spring 158 rocks lever 138 to close contact 134. Shortly afterward the arm 136 drops and the contact opens. The closure of contact 134 sends a winding impulse to solenoid 112, through a circuit which is not shown in the drawing.

*Signal timer*

Figure 4:
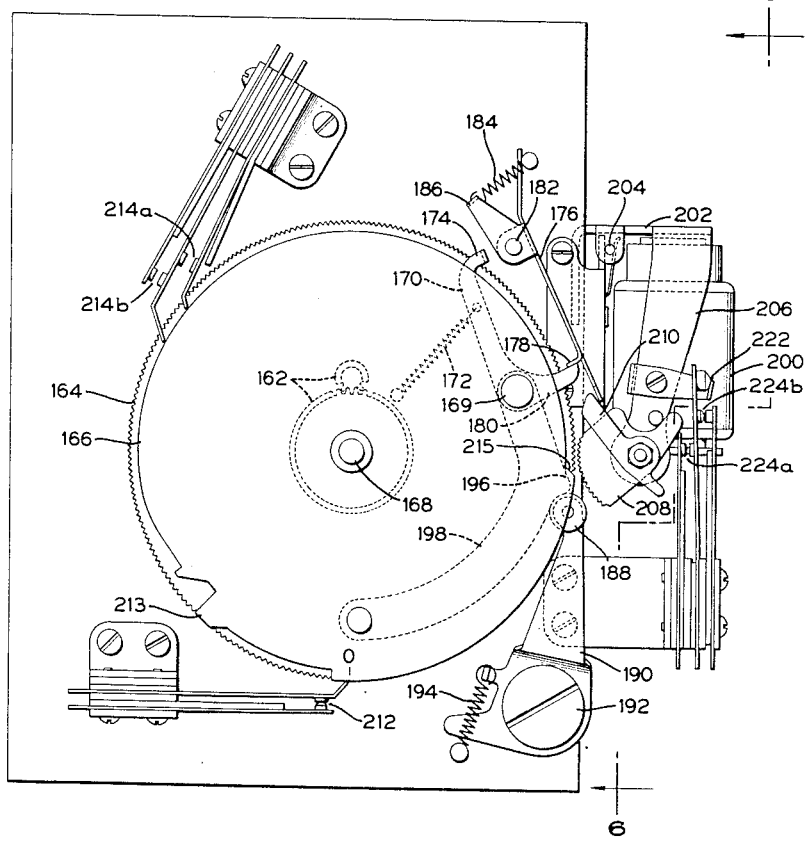
Fig. 4 is a front elevation of the signal timer.
Figure 6:
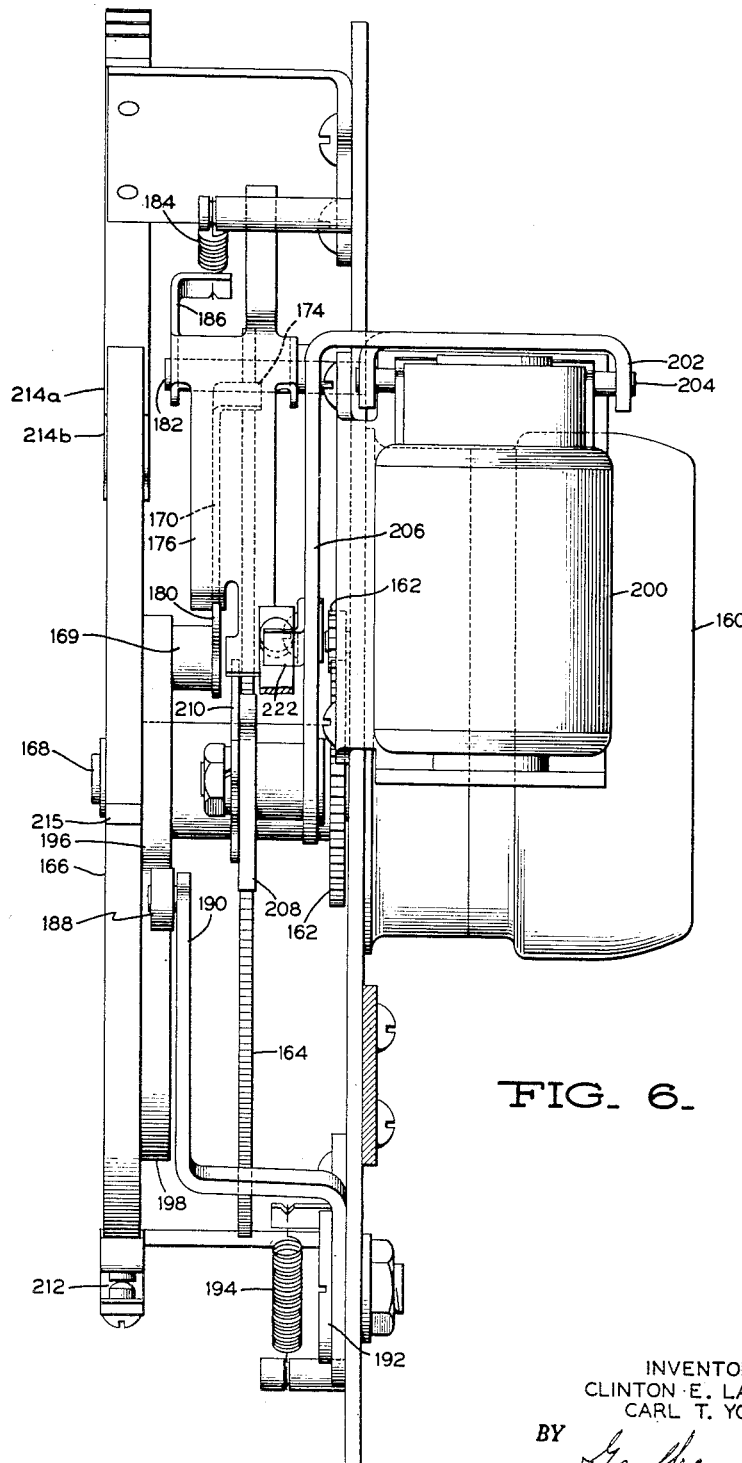
Fig. 6 is a vertical section of the timer, substantially on the line 6—6 of Fig. 4.

In using radio time signals for correcting clocks it is necessary to avoid responses to static. For the purpose of distinguishing the four minute WWV time signals a special 5 minute timer shown in Figs. 4 and 6 is used. This timer is set in operation by the beginning of the signal and causes the signal to be tested again near the end of the four minute period. If the receiver is being energized by a signal of sufficient strength at this time a clock correction action is initiated.

The signal timer is driven by a synchronous motor 160. The output shaft of the motor drives, through gears 162, a serrated clutch disc 164 continuously at the rate of one revolution in five minutes. A cam disc 166 is rotatably mounted on the shaft 168 of the clutch disc. Pivoted on the cam disc is a clutch dog 170 which is urged by a spring 172 in the direction to cause its ear 174 to engage the serrated clutch disc 164. In the normal stationary condition of the cam the clutch dog is held disengaged by a detent 176, which has an ear 178 bearing against a radially projecting arm 180 of the clutch dog. The detent is mounted on a stationary pivot 182 and urged clockwise by a spring 184 connected to its arm 186. In its detented condition the cam disc is urged counterclockwise by a roller 188 on a lever 190 pivoted at 192 and urged in counterclockwise direction by a spring 194. As the timer cam is approaching the end of a revolution the roller rides over a hump 196 on a cam plate 198 attached to the side of the cam disc 166 and completes the movement of the cam disc to its index position, after the clutch dog 170 has been disengaged by detent 176.

The clutch disengaging detent 176 is moved to clear the clutch dog by a mechanism operated by a tone magnet 200, that is to say, a magnet operated by the radio signal. The armature 202 of this magnet is pivoted at 204 and has an arm 206 bearing at its end a pivotally mounted rocking sector 208 having a serrated edge adapted to engage the serrated periphery of the clutch disc 164. When the tone magnet is energized the serrated sector is moved against the clutch disc and begins to rotate clockwise. An arm 210 having a rigid but adjustable relation to the serrated sector 208 then engages the detent 176 and lifts it clear of the arm 180 of the clutch dog. The dog engages the clutch disc 164 and cam 166 begins a revolution which will be completed in five minutes. At this time the signal will have finished and the tone magnet 200 will be de-energized. The detent will therefore be in position to disengage the clutch dog and the cam disc will be latched up in its index position, as the roller 188 rolls down the back of the hump 196. A rise 213 of the cam disc closes the contacts briefly, but the resulting energization of the tone magnet at this time is of no significance.

The cam disc 166 operates two sets of spring contacts. The contacts 212 control the circuit of the tone magnet. These are closed when the cam disc is in its stationary position but open shortly after the cam disc begins to revolve, so that the toothed sector 208 will be withdrawn from the serrated clutch disc by the de-energization of the tone magnet. They are closed again later in the cycle of the timer by a rise 215, for a purpose to be described.

The second set of contacts 214b and 214a are, respectively, for testing the tone near the end of the timing period and for transmitting the resetting signal, if the tone is found to have sufficient strength at the time it is tested. The operation and timing of these contacts will be explained more fully in connection with the circuit diagram.

The radio time signals are received by a pretuned radio receiver of conventional design, the circuit of which is not shown. When the signal is on, the radio receiver produces a D. C. signal at its output terminals.

*Operation and circuit*

The operation of the device in response to various conditions will now be described. The description will first take up the normal case of a radio signal of sufficient strength and without static interference. The device as disclosed is designed to set the clock in response to the 440 cycle tone signal which is transmitted at 55 minutes after the hour. This signal ends at 59 minutes and if the clock is not more than 10 seconds slow or fast it is corrected to the 59th minute position, by setting the seconds hand to the 60th second position.

The signal is received by a pretuned radio receiver 216 which, when a signal is being received, causes an alternating current to flow in the primary coil of a transformer 218. A full wave rectifier secondary circuit produces a D. C. voltage across a filter condenser 220. When contact 212 is closed current will flow through the coil of tone magnet 200. If the signal is strong enough the armature 202 will be attracted and sector 208 will be engaged with the serrated clutch disc 164. A bracket 222 on arm 206 transfers the center spring of a pair of contacts 224a, 224b, opening the normally closed contact 224b and closing the normally open contact 224a.

Figure 5:
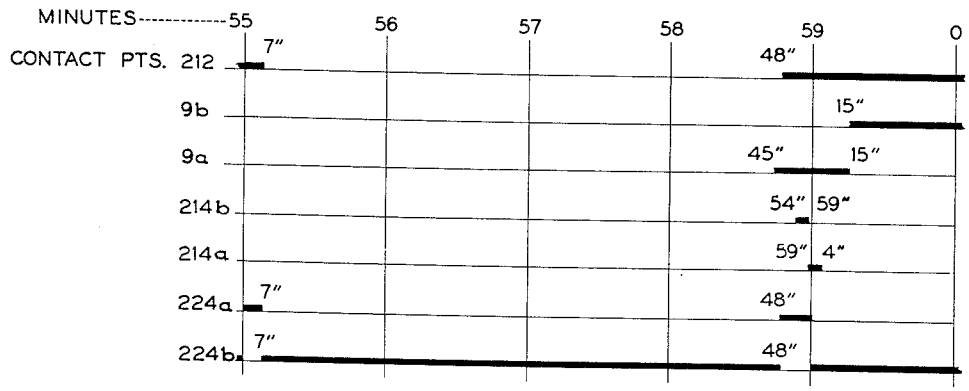
Fig. 5 is a timing chart.

At the time the 440 cycle signal begins at 55' 00'' (see Fig. 5) the contacts 212 are closed and the rectified signal current passes through the tone magnet 200. The armature 202 rotates clockwise and the serrated sector 208 engages the constantly running clutch disc 164. If the signal continues in sufficient strength, at the end of three seconds the arm 210 lifts the detent 176 clear of the clutch dog arm 180 and the clutch engages. At 55' 07'' the contact 212 opens and the tone magnet is de-energized, allowing the toothed sector 208 to drop clear of the clutch disc. The timer cam continues to rotate.

At 58' 45'' the contact points 9a of the master clock close. At 58' 48'' the contact points 212 close again and the signal tone, which is still present, causes tone magnet 200 to become energized. Contact points 224a close and 224b open. At 58' 54'' contact points 214b close to test the strength of the signal. In the case assumed the signal is still of sufficient strength at this time and contacts 224b remain open; there is no circuit through the pick up coil 230 of relay R3. At 58' 59'' the contact points 214a and 214b transfer, so that the points 214a are closed. This completes the following circuit:

From terminal 240 through hour contact 9a, contact points 214a, normally closed points R3c, the pick up coil 231 of latch relay R1, tone contacts 224a, to the terminal 242. Relay R1 is energized, contacts R1c close, and the circuit branches through these contacts, normally closed contacts R2c of relay R2, the coil of the correction magnet 70 to the terminal 242. The correction magnet is energized and the slide 62 executes a motion to the right. If the seconds hand is either slow or fast by an amount not more than 10 seconds, the resetting pin 72 engages the corresponding curved surface of the heart cam 60 and restores the seconds hand to the 60th second position. This occurs during the 60th second. The movement of the slide to the right causes pin 85 to close knock-off contacts 87, completing a circuit through the pick up coil 232 of relay R2. The normally closed contact R2c opens, breaking the circuit of the correction magnet 70 and causing this magnet to become de-energized. The correction slide is then restored to its normal left position by return spring 233.

At 59' 15" the hour contacts 9b close and contacts 9a open. This completes a circuit from the terminal 240 through the contacts 9b, through each of the latch trip coils 234, 236, 238, in parallel, to the terminal 242. The two latch relays R1 and R2 which were energized are thereby restored to their normal state.

The second condition which will be considered will be the fading of the signal after the timer has been started. It will be assumed that at 58' 54", when the contact points 214b close, the signal strength is below the minimum required and contact points 224b are closed. A circuit is then completed from terminal 240 through contacts 9a, contacts 214b pick up coil 230 of relay R3, contacts 224b, to the terminal 242, latching up the relay R3. The contacts R3c open and when the contacts 214a close at 58' 59" the circuit is not completed through the pick up coil 231 of relay R1. This is true even if the signal should have improved enough at the time contacts 214a closed to have transferred the contacts 224a to the closed position. There is no resetting action in this case. At 59' 15" when contacts 9b close the latch trip coil 234 of relay R3 is energized and this relay is restored to its normal condition. This defective timing signal is passed by and the clock awaits the timing signal which follows at 55 minutes in the next hour.

A third condition now to be considered is that of a signal which starts too weak to energize the tone magnet 200 at the starting time, but which later becomes strong enough to energize the tone magnet. Assume that at 56 minutes past the hour the signal becomes strong enough to energize the tone magnet and start the timer. The contacts 214b will close one minute late, at 59' 54" in this case. This is after the signal has terminated and the tone magnet is de-energized. The contacts 224b are closed and a circuit is completed through the hour contact 9a, contact 214b, pick up coil 230 of relay R3, contact 224b, terminal 242, latching up relay R3. When contacts 214a close contacts R3c are open, as well as contacts 224a. The pick up coil 231 of relay R1 is therefore not energized, the relay R1 remains unlatched, and there is no resetting action.

Only a signal which starts with sufficient strength to energize the tone magnet and which has sufficient strength from test time at 58' 54" past 58' 59" can start a correction cycle. If it fails in any of these respects the clock awaits the signal one hour later. One signal in one or two days is actually enough to keep a master clock within the resetting range of 10 seconds either way. The limits of resetting mentioned are merely those of the illustrative clock shown and are not in any sense a limitation of the invention.

While the invention has been shown as embodied in an escapement type of clock, it can be applied to other kinds of clocks as well, such as synchronous motor driven clocks.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Radio time signal controlled means for correcting clocks, comprising a normally inactive timer, a radio receiver, means controlled by a signal received by said receiver for starting said timer, clock resetting means, and means controlled jointly by said timer and a signal received by said receiver for activating said clock resetting means.

2. Radio time signal controlled means for correcting clocks, comprising a normally inactive timer, a radio receiver, means controlled by a signal received by said receiver for starting said timer, electromagnetically operated clock resetting means, and a circuit for the electromagnet of said clock resetting means, including circuit closing means controlled by said timer and other circuit closing means controlled by a signal received by said receiver.

3. In a radio signal controlled device for correcting clocks, means for mechanically resetting a clock to a predetermined time, means including an electromagnet for operating said resetting means, a circuit for said electromagnet, signal started timer, means controlled by said timer for testing the strength of the signal at a definite time interval after the start of said timer, and means dependent upon the result of said test for closing said circuit.

4. In a radio signal controlled clock correcting device, a signal started timer, contact means controlled by the signal and including normally closed contacts closed when the signal is below a certain level and normally open contacts closed when the signal is above said level, a fadeout circuit including a current responsive device and said normally closed contacts, a correction circuit including a current responsive device, said normally open contacts, and normally closed contacts adapted to be opened by said fadeout circuit current responsive device, means controlled by said timer for first testing said fadeout circuit for a predetermined interval and then testing said correction circuit, and means controlled by the current responsive device of said correction circuit for resetting the clock.

5. In a radio signal controlled clock correcting device, a signal started timer, means controlled by said timer for testing the strength of the signal at a predetermined time after the start of said timer, and means controlled by the result of said test for resetting the clock.

6. A clock correcting device as described in claim 3, characterized by the fact that said test of the signal is timed to occur near the end of the radio signal which started the timer.

7. In a clock correcting device adapted to be controlled by radio time signals of definite duration occurring repeatedly within a given time interval, clock resetting means, a signal started timer, means controlled by said timer for initiating an operation of said resetting means, means controlled by the timer and operated in dependence upon the strength of the signal for preventing an operation of said resetting means, and means controlled by the clock for limiting the operation of said resetting means to once during said interval.

8. In a timekeeping apparatus regulated by radio signals of definite duration transmitted at predetermined times; a clock mechanism including time indicating means and means to operate the same normally within a limit of error; resetting means to move said time indicating means to a definite time indication; a radio signal receiver; a normally inactive signal timer; current operated means responsive to a signal received by said receiver for starting said signal timer; test means controlled by said signal timer, to test the condition of said current operated means near the end of a time period, measured by said signal timer, equal to the duration of the radio time signal; and means controlled in accordance with the result of said test for initiating an operation of said resetting means.

9. In a timekeeping apparatus regulated by radio signals of definite duration transmitted at predetermined times; a clock mechanism including time indicating means and means to operate the same normally within a limit of error; resetting means to move said time indicating means to a definite time indication; a radio signal receiver; a normally inactive signal timer; current operated means responsive to a signal received by said receiver for starting said signal timer; test means controlled by said signal timer, to test the condition of said current operated means near the end of a time period, measured by said signal timer, equal to the duration of the radio time signal; and means controlled in accordance with the result of said test and dependent upon a continuation of said signal after said test for a short interval, for initiating an operation of said resetting means.

10. In a timekeeping apparatus regulated by radio signals of definite duration transmitted at predetermined times; a clock mechanism including time indicating means and means to operate the same normally within a limit of error; resetting means including an electromagnet for moving said time indicating means to a definite time indication; a radio signal receiver; a normally inactive signal timer; current operated means responsive to a signal received by said receiver for starting said signal timer; a circuit for said electromagnet including a normally open contact closed by said signal timer near the end of a time period, measured by said signal timer, equal to the duration of the radio time signal, said circuit also including another contact controlled by said current operated means.

References Cited in the file of this patent

UNITED STATES PATENTS

| Number | Name | Date |
|---|---|---|
| 534,319 | Crook | Feb. 19, 1895 |
| 2,614,383 | Pfeffer | Oct. 21, 1952 |